(12) United States Patent
Yu et al.

(10) Patent No.: US 12,307,641 B2
(45) Date of Patent: May 20, 2025

(54) HALF-CAST MARK IDENTIFICATION AND DAMAGED FLATNESS EVALUATION AND CLASSIFICATION METHOD FOR BLASTHOLES IN TUNNEL BLASTING

(71) Applicants: Huaqiao University, Quanzhou (CN); Sanming University, Sanming (CN)

(72) Inventors: Jin Yu, Xiamen (CN); Xiaoqiang Fu, Xiamen (CN); Wei Yao, Xiamen (CN); Yanyan Cai, Xiamen (CN); Shiyu Liu, Xiamen (CN)

(73) Assignees: Huaqiao University, Quanzhou (CN); Sanming University, Sanming (CN)

( * ) Notice: Subject to any disclaimer, the term of this patent is extended or adjusted under 35 U.S.C. 154(b) by 455 days.

(21) Appl. No.: 17/963,915

(22) Filed: Oct. 11, 2022

(65) Prior Publication Data
US 2023/0162341 A1 May 25, 2023
US 2023/0351576 A9 Nov. 2, 2023

(30) Foreign Application Priority Data
Nov. 24, 2021 (CN) .......................... 202111398003.1

(51) Int. Cl.
*G06T 7/136* (2017.01)
*E21D 9/00* (2006.01)
(Continued)

(52) U.S. Cl.
CPC ............ *G06T 7/0002* (2013.01); *E21D 9/003* (2013.01); *E21D 9/006* (2013.01); *G06T 3/40* (2013.01);
(Continued)

(58) Field of Classification Search
None
See application file for complete search history.

(56) References Cited

U.S. PATENT DOCUMENTS
2015/0241191 A1* 8/2015 Garcia ...................... F42D 3/04
102/311
2020/0250355 A1* 8/2020 Giltner .................. G06Q 50/02

FOREIGN PATENT DOCUMENTS
BR         112021011853 B1 * 12/2019

* cited by examiner

*Primary Examiner* — Idowu O Osifade
*Assistant Examiner* — Dylan John Mendez Muniz
(74) *Attorney, Agent, or Firm* — Birch, Stewart, Kolasch & Birch, LLP (57) ABSTRACT

The present disclosure relates to a half-cast mark identification and damaged flatness evaluation and classification method for blastholes in tunnel blasting, including the following steps: S1-2: photographing first and second contrast images as well as a half-cast mark image after blasting; S3-6: performing denoising, gray-scale processing and binary processing on the above images, and identifying a boundary of a half-cast mark in each of the images; S7-9: determining a flatness damage variable, a quantitative relation among an area of a half-cast mark region, the damage variable and a fractal dimension, and a damage value of the half-cast mark image; S10-11: forming five-dimensional (5D) eigenvectors to obtain multi-dimensional digital information features of the images; and S12-13: selecting eigenvectors of 60 images as training data to input to a naive Bayes classifier (NBC), and taking eigenvectors of remaining 30 images as classification data to input the above well-trained NBC for classification.

8 Claims, 10 Drawing Sheets

(51) Int. Cl.
*G06T 3/40* (2006.01)
*G06T 5/20* (2006.01)
*G06T 5/40* (2006.01)
*G06T 5/70* (2024.01)
*G06T 7/00* (2017.01)
*G06T 7/13* (2017.01)
*G06T 7/149* (2017.01)
*G06T 7/194* (2017.01)
*G06V 10/764* (2022.01)
*G06V 10/774* (2022.01)
*G06V 10/776* (2022.01)
*F42D 3/04* (2006.01)

(52) U.S. Cl.
CPC ................. *G06T 5/20* (2013.01); *G06T 5/40* (2013.01); *G06T 5/70* (2024.01); *G06T 7/13* (2017.01); *G06T 7/136* (2017.01); *G06T 7/149* (2017.01); *G06T 7/194* (2017.01); *G06V 10/764* (2022.01); *G06V 10/774* (2022.01); *G06V 10/776* (2022.01); *F42D 3/04* (2013.01); *G06T 2207/20081* (2013.01); *G06T 2207/20116* (2013.01); *G06T 2207/30181* (2013.01); *G06T 2207/30204* (2013.01)

```
┌─────────────────────────────────────────────────────────────────────┐
│ Select a first contrast image with an ideal half-cast mark and a    │
│ second contrast image with seriously excessive backbreak or         │
│ overbreak as standard contrast images                               │
└─────────────────────────────────────────────────────────────────────┘
                                    │
┌─────────────────────────────────────────────────────────────────────┐
│ Photograph a forming image of a surrounding rock surface in site in │
│ tunnel blasting, a size of the image being determined by an         │
│ analysis scale and being consistent with that of each of the        │
│ contrast images                                                     │
└─────────────────────────────────────────────────────────────────────┘
                                    │
┌─────────────────────────────────────────────────────────────────────┐
│ Perform Gaussian denoising on the three images to obtain denoised   │
│ images                                                              │
└─────────────────────────────────────────────────────────────────────┘
                                    │
┌─────────────────────────────────────────────────────────────────────┐
│ Perform gray-scale and binary processing on the denoised images     │
└─────────────────────────────────────────────────────────────────────┘
                                    │
┌─────────────────────────────────────────────────────────────────────┐
│ Extract a boundary and a cover area of a half-cast mark through a   │
│ GVF-snake-ACM                                                       │
└─────────────────────────────────────────────────────────────────────┘
                                    │
┌─────────────────────────────────────────────────────────────────────┐
│ Import each of three half-cast mark identified images to ImageJ     │
│ software, and determine a ratio of an area of a half-cast mark      │
│ region to a total area of the image as a damage variable            │
└─────────────────────────────────────────────────────────────────────┘
                                    │
┌─────────────────────────────────────────────────────────────────────┐
│ Normalize an interval for an area ratio of a half-cast mark in each │
│ of the first contrast image and the second contrast image and       │
│ establish a quantitative relation between a damage degree and a     │
│ fractal dimension D                                                 │
└─────────────────────────────────────────────────────────────────────┘
                                    │
┌─────────────────────────────────────────────────────────────────────┐
│ Calculate a ratio of a cover area of a half-cast mark of the third  │
│ analysis image to a total area of the image, normalize an interval  │
│ of the ratio, and determine a damage value of the analysis image    │
│ through linear interpolation                                        │
└─────────────────────────────────────────────────────────────────────┘
                                    │
┌─────────────────────────────────────────────────────────────────────┐
│ Respectively acquire 90 forming images for a blast surrounding rock │
│ surface in conventional blasting, presplit blasting and smooth      │
│ blasting                                                            │
└─────────────────────────────────────────────────────────────────────┘
                                    │
┌─────────────────────────────────────────────────────────────────────┐
│ Respectively extract five eigenvalues in different directions with  │
│ a GLCM for the 90 half-cast mark identified images in different     │
│ plans                                                               │
└─────────────────────────────────────────────────────────────────────┘
                                    │
┌─────────────────────────────────────────────────────────────────────┐
│ Input 5D eigenvectors of 60 images to an NBC for training, thereby  │
│ ensuring the classification precision                               │
└─────────────────────────────────────────────────────────────────────┘
                                    │
┌─────────────────────────────────────────────────────────────────────┐
│ Input remaining 30 images to the NBC to evaluate and classify       │
│ flatness of surrounding rock surfaces in different blasting plans   │
└─────────────────────────────────────────────────────────────────────┘
```

| Category \ Angle | 0° | 45° | 90° | 135° |
|---|---|---|---|---|
| Energy mean | 0.0913 | 0.079 | 0.101 | 0.077 |
| Entropy mean | 2.991 | 3.0867 | 2.756 | 3.124 |
| Contrast mean | 0.538 | 0.618 | 0.247 | 0.690 |
| Correlation mean | 0.182 | 0.181 | 0.188 | 0.180 |
| Uniformity mean | 0.818 | 0.785 | 0.886 | 0.776 |

HALF-CAST MARK IDENTIFICATION AND DAMAGED FLATNESS EVALUATION AND CLASSIFICATION METHOD FOR BLASTHOLES IN TUNNEL BLASTING

CROSS REFERENCE TO RELATED APPLICATION

This patent application claims the benefit and priority of Chinese Patent Application No. 202111398003.1, filed with the China National Intellectual Property Administration on Nov. 24, 2021, the disclosure of which is incorporated by reference herein in its entirety as part of the present application.

TECHNICAL FIELD

The present disclosure relates to the field of image analysis in tunnel blasting, and in particular to a half-cast mark identification and damaged flatness evaluation and classification method for blastholes in tunnel blasting.

BACKGROUND

The contour forming quality and a half-cast mark rate in tunnel blasting are crucial to evaluate excavation quality of tunnel drilling and blasting and a utilization rate of blastholes, and are main factors to directly determine construction period and investment cost of the tunnel.

The conventional blasting evaluation method is implemented simply by identifying and determining apparent characteristics of a half-cast mark in site by naked eyes, and surveying the half-hole mark with a tape or a total station. The half-cast mark rate is calculated by only extracting data about remaining lengths of the blastholes, which does not take into account influences from an overall flatness of a certain region around the blastholes on the damage and is seriously affected by subjective consciousnesses of surveyors. Till now, there haven't been any reports concerning statistical classification of damaged flatness in different blasting methods. In the prior art, the damaged flatness is artificially identified, determined and classified in most cases, with large identification and classification errors, poor robustness and poor stability, which is far from satisfactory in production practices. Therefore, there is an urgent need to provide convenient and efficient half-cast mark identification and feature parameter extraction methods for blastholes in tunnel blasting as well as a damaged flatness and classification method for surrounding rock surface in different blasting plans, so as to scientifically select related parameters in the tunnel blasting and determine the blasting plan, thereby realizing the ideal tunnel blasting.

SUMMARY

In view of technical problems of artificial identification in the background, the present disclosure provides a half-cast mark identification and damaged flatness evaluation and classification method for blastholes in tunnel blasting.

A half-cast mark identification and damaged flatness evaluation and classification method for blastholes in tunnel blasting includes the following specific steps:

S1: photographing standard contrast images, a size of each of the standard contrast images being comprehensively determined by an analysis scale, and the standard contrast images including a first contrast image of surrounding rock surface with an ideal half-cast mark and a second contrast image that is unacceptable with excessive backbreak or overbreak;

S2: acquiring a half-cast mark image after actual blasting to serve as a third analysis image, a size and a photographing environment of the analysis image being consistent with those of the above contrast images;

S3: denoising the above three images by a two-dimensional (2D) Gaussian algorithm according to a characteristic that Gaussian noise in an acquired image obeys a normal distribution;

S4: performing gray-scale processing on three denoised images according to a preset threshold of an image histogram to reduce an original data volume in each of the images, thereby preventing image distortion to lose information;

S5: performing binary processing on gray-scale processed images, and setting an optimal binary threshold by maximum entropy thresholding, so as to extract boundary contours of the half-cast mark images;

S6: identifying a boundary and a related region of a half-cast mark in each of the images with a gradient vector flow (GVF)-Snake and active contour model (ACM) (GVF-Snake-ACM);

S7: importing each of three half-cast mark identified images to ImageJ software, and determining a ratio of an area of a half-cast mark region to a total area of the image as a flatness damage variable;

S8: normalizing an interval for an area ratio of a half-cast mark in each of the first contrast image and the second contrast image, and establishing a quantitative relation $\omega=(D)^{\beta}$ between a damage degree and a fractal dimension D, thereby determining a quantitative relation among the area ratio of the half-cast mark region, the damage variable and the fractal dimension;

S9: determining a damage value of the third analysis image through linear interpolation calculation on an area ratio of a half-cast mark;

S10: extracting, for each of a plurality of half-cast mark identified images with a gray-level co-occurrence matrix (GLCM) in 0°, 45°, 90°, and 135° directions or 180°, 225°, 270°, and 315° directions, five eigenvalues including an energy mean, an entropy mean, a contrast mean, a correlation mean, and a uniformity mean, thereby forming a five-dimensional (5D) eigenvector;

S11: respectively photographing 90 blasting images for a tunnel excavation surrounding rock surface in three blasting plans, which specifically include conventional blasting, presplit blasting and smooth blasting and employ a same explosive charge during tunneling, to form a set $C=\{c_1, c_2, c_3\}$, analyzing target matrices corresponding to the conventional blasting, the presplit blasting and the smooth blasting, and obtaining 5D eigenvectors $F=\{f_1, f_2, f_3, f_4, f_5\}$, in different blasting plans, where a feature attribute of each of the images is composed of a 5D eigenvector, including an energy mean, an entropy mean, a contrast mean, a correlation mean, and a uniformity mean, thereby obtaining a multi-dimensional digital information feature of the image;

S12: randomly selecting 5D eigenvectors of 60 images from the image set in the three different blasting plans as training data to input to a naive Bayes classifier (NBC), and calculating with five eigenvalues $f_i(i=1,2,3,4,5)$ of each of the images, a probability that a training image falls into a category $c_j(j=1,2,3)$ $$P(c_j/F) = \frac{P(c_j)P(c_j/F)}{P(F)} = \frac{P(c_j)P(f_1, f_2, f_3, f_4, f_5/c_j)}{P(F)},$$

where for an eigenvector F, a larger posterior probability $P(c_j/F)$ indicates a higher probability that the F falls into $c_j$, and the category into which the F falls is calculated by:

$$c(F) = \arg\max\ P(c_j)\prod_{j=1}^{3} P(f_i \mid c_j),$$

and after $P(c_j)$ and $P(c_j/F)$ are calculated, a category with a maximum posterior probability is returned, thereby obtaining the category of the F; and S13: inputting eigenvectors of remaining 30 images in the image set in the different blasting plans to a well-trained NBC, and determining a state with a maximum probability in different given categories $c_j(j=1,2,3)$ based on a maximum a posteriori (MAP) principle of the NBC to take as a final result for evaluation and classification of the blasting plans, thereby implementing classification on blasting effects of the conventional blasting, the presplit blasting and the smooth blasting and on damaged flatness of surrounding rock surfaces.

Preferably, in step S3, a Gaussian filter based model satisfies the following 2D Gaussian distribution:

$$G(x, y) = \frac{1}{2\pi\sigma^2} e^{-\frac{x^2+y^2}{2\sigma^2}}$$

where x and y are transverse and longitudinal sizes of the image, and $\sigma^2$ is a variance of the normal distribution.

Preferably, in step S5, the maximum entropy thresholding specifically includes: defining, according to a concept of a Shannon entropy, an entropy of an image having a gray scale in a range of 0, 1, 2, . . . , L−1 as $$H = \sum_{i=0}^{L-1} iP_i,$$

$P_i$ being a probability that a pixel having a value of i occupies the whole image, and dividing the image into a target O and a background B according to a set threshold t, probabilities of the pixel in the target and the background being:

region $O$: $\frac{P_i}{P_t}$, $i = 0, 1, ..., t$, where, $P_t = \sum_{i=0}^{t} P_i$; and region $B$: $\frac{P_i}{1 - P_t}$, $i = t + 1, ..., L - 1$.

Preferably, the target O and the background B each have the following entropy function:

$$H_o(t) = -\sum_{i=0}^{t} \frac{p_i}{P_t} \ln \frac{p_i}{P_t} = \ln P_t + \frac{H_t}{P_t}, \text{ where } H_t = -\sum_{i=0}^{t} p_i \ln p_i;$$

$$H_B(t) = -\sum_{i=t+1}^{L-1} \frac{p_i}{1-P_t} \ln \frac{p_i}{1-P_t} = \ln(1 - P_t) + \frac{H - H_t}{1 - P_t},$$

where $H = -\sum_{i=0}^{L-1} p_i \ln p_i;$ a total entropy of the image is:

$$H(t) = H_o(t) + H_B(t) = \ln P_t(1 - P_t) + \frac{H_t}{P_t} + \frac{H - H_t}{1 - P_t}$$

the total entropy of the image is maximized through a maximum threshold T:

T=arg max(H(t)); and the optimal binary threshold is determined according to a principle of maximizing the total entropy of the image.

Preferably, step S6 specifically includes:

S61: acquiring pixel points on a row and a column of an initial image $I_{m \times n}$ (having a resolution of m×n) at a step length d=2, and performing downsampling for s times to obtain s+1 to-be-tested images (including the initial image $I_{m \times n}$), where a resolution in kth sampling is $$I_{\frac{m}{2^k} \times \frac{n}{2^k}};$$

S62: preprocessing an image $$I_{\frac{m}{2^s} \times \frac{n}{2^s}}$$

in sth downsampling, performing edge detection with a Canny operator, defining an initial contour $l_{s+1}$ on an edge image, a number of control points on the initial contour $l_{s+1}$ being $N_{s+1}$, and calculating a GVF external force field, where due to a diffusivity of the GVF external force field in a smooth region, the initial contour $l_{s+1}$ approaches continuously to an edge of the image; and when $0.98N_{s+1}$ control points on the initial contour $l_{s+1}$ reach a target contour (a termination criterion), it is considered that an initial contour curve reaches a target edge, and iteration is stopped to obtain a target contour curve $l_s$ at the resolution $$\frac{m}{2^s} \times \frac{n}{2^s};$$

S63: preprocessing an image $$I_{\frac{m}{2^{s-1}} \times \frac{n}{2^{s-1}}}$$

in (s−1)th downsampling with the Canny operator, taking the contour curve $l_s$ in the previous step as an initial contour curve, recalculating a GVF external force field on the image $$I_{\frac{m}{2^{s-1}} \times \frac{n}{2^{s-1}}},$$

and obtaining a target contour curve $l_{s-1}$ according to the termination criterion in step 62 under pushing of an external force; and S64: repeating step S63, to until a target contour curve l of the identified image $l_{m \times n}$ is obtained.

Preferably, in step S7, the flatness damage variable is calculated by $$\omega = \frac{A^*}{A} = \frac{n^*}{n},$$

where A* is the area of the identified half-cast mark region, A is the total area of the image, n* is a number of pixel points in the half-cast mark region of the image, and n is a total number of pixel points in the image.

Preferably, in step S7, ω=0 indicates that the half-cast mark is clear in a damage negligible state; ω=1 indicates that the half-cast mark is diffused in a completely damaged state; and 0<ω<1 indicates that the surrounding rock surface is damaged in different degrees.

Preferably, in step S12, a training number is set as 1,000 times; and the NBC is trained repeatedly with a plurality of sets of image data, until a classification error in training is less than $10^{-3}$.

The present disclosure has the following beneficial effects:

1. The present disclosure solves problems of half-cast mark identification and feature extraction for blastholes in tunnel blasting through combinational algorithms, implements scientific classification for damaged flatness of a surrounding rock surface in conventional blasting, presplit blasting and smooth blasting, and overcomes problems of poor precision and no adaptation of conventional half-cast mark identification and evaluation.
2. The present disclosure provides a half-cast mark identification method that meets future automatic, intelligent and delicate tunnel blasting requirements, and a damaged flatness classification method for the surrounding rock surface after the blasting, further provides a more complete and scientific feature digitalization solution for the half-cast mark of the blastholes in the tunnel blasting, solves the defects of poor surveying precision, poor operability and serious restriction from subjective idea of surveyors in the conventional artificial surveying method, and provides intelligent, convenient and efficient identification, evaluation and classification methods for dedicate blasting design and parameter optimization of the tunnel.

Other parts not mentioned in the method are the same as those in the prior art or can be implemented by the prior art.

BRIEF DESCRIPTION OF THE DRAWINGS

FIG. 1 is a flowchart of a half-cast mark identification and damaged flatness evaluation and classification method for blastholes in tunnel blasting according to the present disclosure;

DETAILED DESCRIPTION OF THE EMBODIMENTS

The technical solutions of the present disclosure are further described in detail below with reference to specific embodiments.

Figure 4:
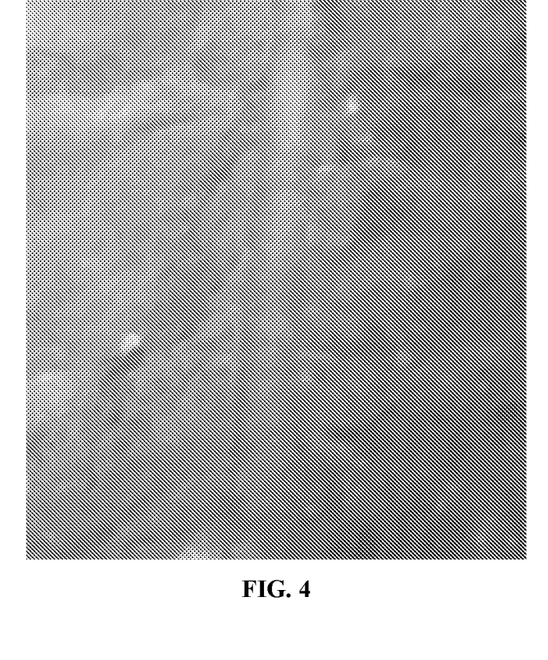
FIG. 4 illustrates a first photographed contrast image of a surrounding rock surface with an ideal half-cast mark of a blasthole.
Figure 5:
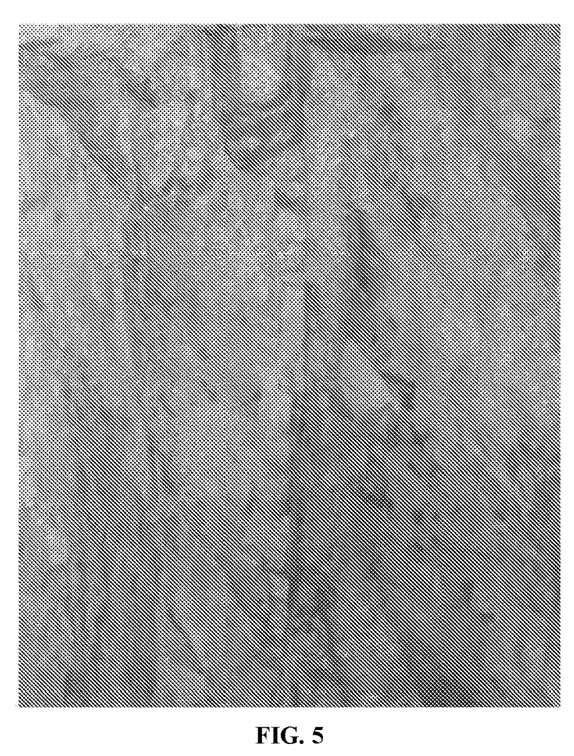
FIG. 5 illustrates a second photographed contrast image of an unacceptable surrounding rock surface with excessive backbreak or overbreak.

Referring to FIGS. 1-14, a half-cast mark identification and damaged flatness evaluation and classification method for blastholes in tunnel blasting includes the following specific steps:

S1: Photograph standard contrast images, a size of each of the standard contrast images being comprehensively determined by an analysis scale, and the standard contrast images including a first contrast image of a rock surface with an ideal half-hole mark and a second contrast image that is unacceptable with excessive backbreak or overbreak.

Figure 2:
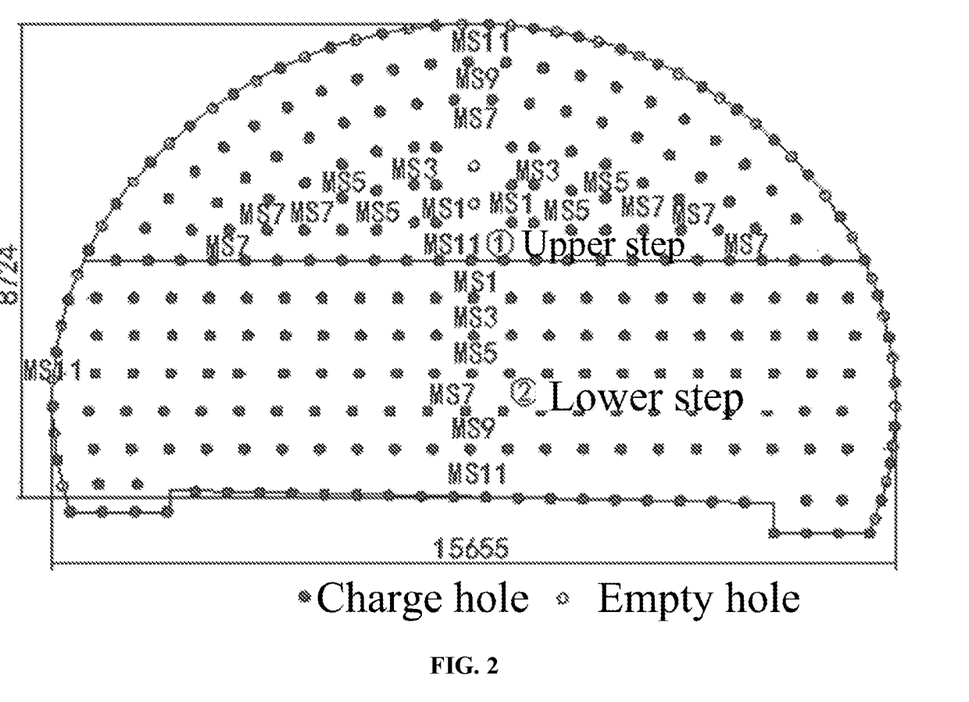
FIG. 2 illustrates a layout of a blasthole of a typical tunnel blasting.
Figure 3:
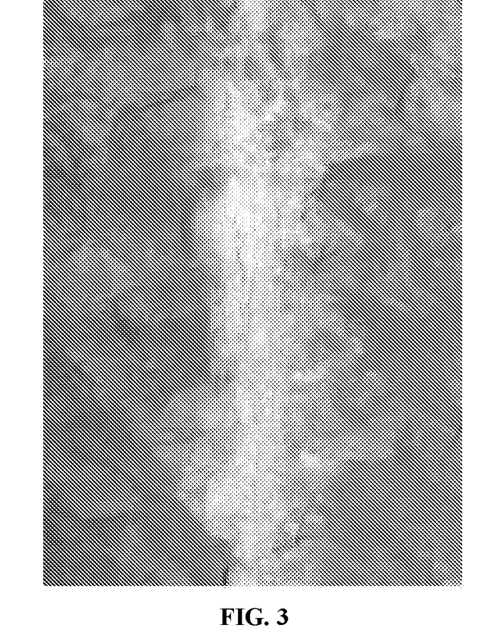
FIG. 3 illustrates a third analysis image for a half-cast mark in tunnel blasting.

S2: Acquire a half-cast mark image after actual blasting to serve as a third analysis image, a size and a photographing environment of the analysis image being consistent with those of the above contrast images.

S3: Denoise the above three images by a 2D Gaussian algorithm according to a characteristic that Gaussian noise in an acquired image obeys a normal distribution. A Gaussian filter based model satisfies the following 2D Gaussian distribution:

$$G(x, y) = \frac{1}{2\pi\sigma^2} e^{-\frac{x^2+y^2}{2\sigma^2}},$$

where x and y are transverse and longitudinal sizes of the image, and $\sigma^2$ is a variance of the normal distribution.

S4: Perform gray-scale processing on three denoised images according to a preset threshold of an image histogram to reduce an original data volume in each of the images, thereby preventing image distortion to lose information.

Figure 6:
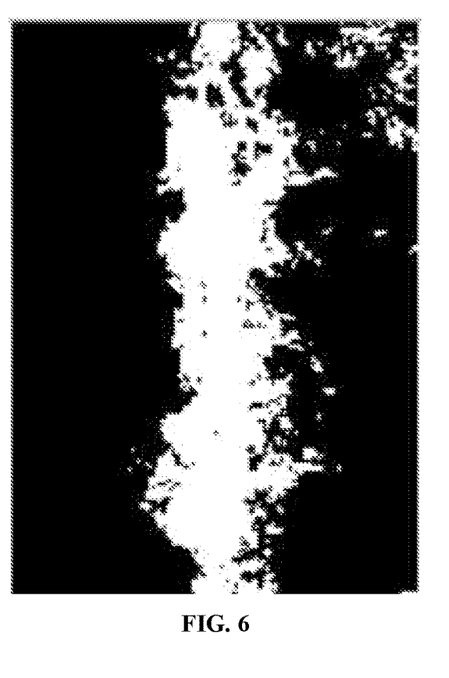
FIG. 6 illustrates a binary processing result of an analysis image.

S5: Perform binary processing on gray-scale processed images, and set an optimal binary threshold by maximum entropy thresholding. The maximum entropy thresholding specifically includes: Define, according to a concept of a Shannon entropy, an entropy of an image having a gray scale in a range of 0, 1, 2, ..., L–1 as $$\sum_{i=0}^{L-1} iP_i,$$

$P_i$ being a probability that a pixel having a value of i occupies the whole image, and divide the image into a target O and a background B according to a set threshold t, probabilities of the pixel in the target and the background being:

$$\text{region } O: \frac{P_i}{P_t}, i = 0, 1, ..., t, \text{ where, } P_t = \sum_{i=0}^{t} P_i; \text{ and}$$

$$\text{region } B: \frac{P_i}{1-P_t}, i = t+1, ..., L-1.$$

In the present disclosure, the target O and the background B each have the following entropy function:

$$H_O(t) = -\sum_{i=0}^{t} \frac{p_i}{P_t} \ln \frac{p_i}{P_t} = \ln P_t + \frac{H_t}{P_t}, \text{ where } H_t = -\sum_{i=0}^{t} p_i \ln p_i;$$

$$H_B(t) = -\sum_{i=t+1}^{L-1} \frac{p_i}{1-P_t} \ln \frac{p_i}{1-P_t} = \ln(1-P_t) + \frac{H-H_t}{1-P_t},$$

$$\text{where } H = -\sum_{i=0}^{L-1} p_i \ln p_i;$$

a total entropy of the image is:

$$H(t) = H_O(t) + H_B(t) = \ln P_t(1-P_t) + \frac{H_t}{P_t} + \frac{H-H_t}{1-P_t}$$

the total entropy of the image is maximized through a maximum threshold T:

T=arg max(H(t)); and the optimal binary threshold is determined according to a principle of maximizing the total entropy of the image.

Figure 7:
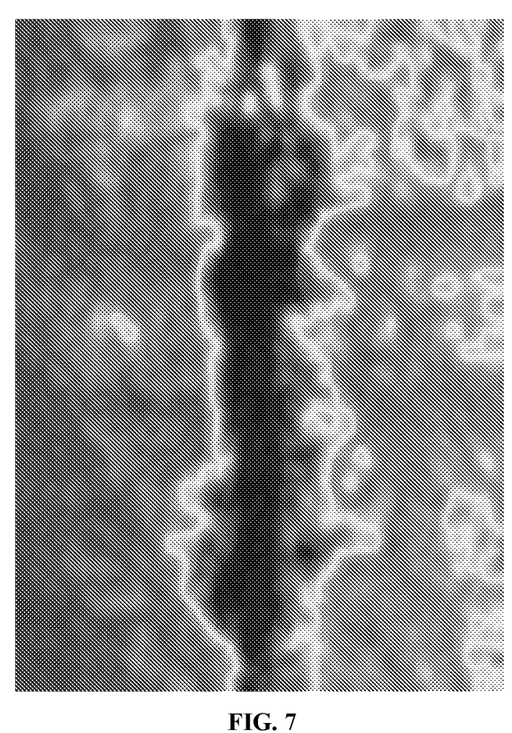
FIG. 7 illustrates an identified result of a GVF-Snake.
Figure 8:
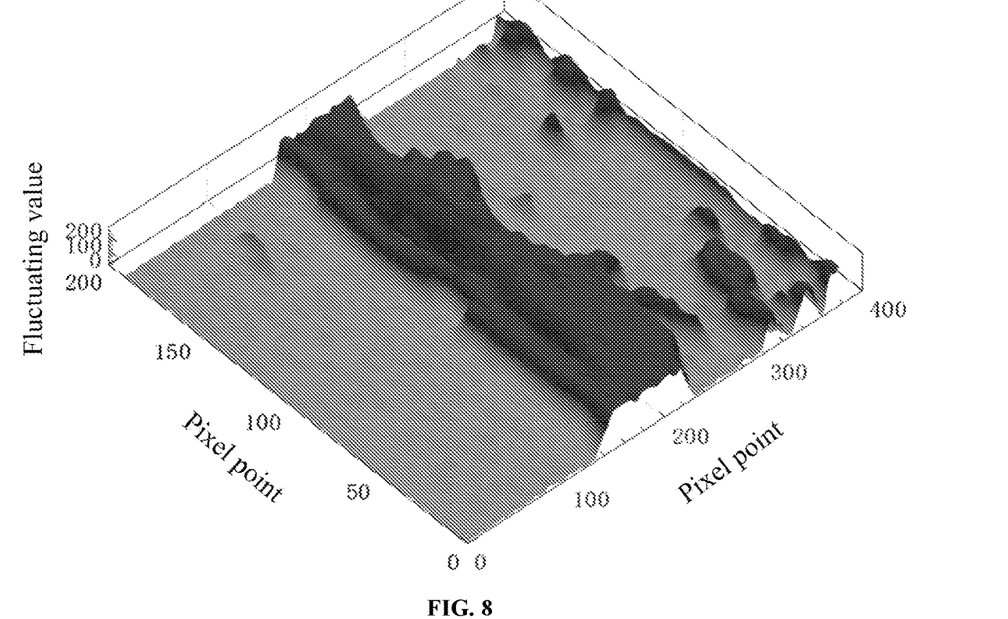
FIG. 8 illustrates an identified result of an ACM model for a half-cast mark.

S6: Identify a boundary and a related region of a half-cast mark in each of the images with a GVF-Snake-ACM.

S61: Acquire pixel points on a row and a column of an initial image $I_{m \times n}$ (having a resolution of m×n) at a step length d=2, and perform downsampling for s times to obtain s+1 to-be-tested images (including the initial image $I_{m \times n}$), where a resolution in kth sampling is $$I_{\frac{m}{2^k} \times \frac{n}{2^k}}.$$

S62: Preprocess an image $$I_{\frac{m}{2^s} \times \frac{n}{2^s}}$$

in sth downsampling, perform edge detection with a Canny operator, define an initial contour $l_{s+1}$ on an edge image, a number of control points on the initial contour $l_{s+1}$ being $N_{s+1}$, and calculate a GVF external force field, where due to a diffusivity of the GVF external force field in a smooth region, the initial contour $l_{s+1}$ approaches continuously to an edge of the image; and when $0.98N_{s+1}$ control points on the initial contour $l_{s+1}$ reach a target contour (a termination criterion), it is considered that an initial contour curve reaches a target edge, and iteration is stopped to obtain a target contour curve $l_s$ at the resolution $$\frac{m}{2^s} \times \frac{n}{2^s}.$$

S63: Preprocess an image $$I_{\frac{m}{2^{s-1}} \times \frac{n}{2^{s-1}}}$$

in (s−1)th downsampling with the Canny operator, take the contour curve $l_s$ in the previous step as an initial contour curve, recalculate a GVF external force field on the image $$I_{\frac{m}{2^{s-1}} \times \frac{n}{2^{s-1}}},$$

and obtain a target contour curve $l_{s-1}$ according to the termination criterion in Step S62 under pushing of an external force.

S64: Repeat Step S63, to until a target contour curve l of the identified image $l_{m \times n}$ is obtained.

S7: Import each of three half-cast mark identified images to ImageJ software, and determine a ratio of an area of a half-cast mark region to a total area of the image as a flatness damage variable: The flatness damage variable is calculated by $$\omega = \frac{A^*}{A} = \frac{n^*}{n},$$

where A* is the area of the identified half-cast mark region, A is the total area of the image, n* is a number of pixel points in the half-cast mark region of the image, and n is a total number of pixel points in the image. ω=0 indicates that the half-cast mark is clear in a damage negligible state; ω=1 indicates that the half-cast mark is diffused in a completely damaged state; and 0<ω<1 indicates that the surrounding rock surface is damaged in different degrees.

Figure 9:
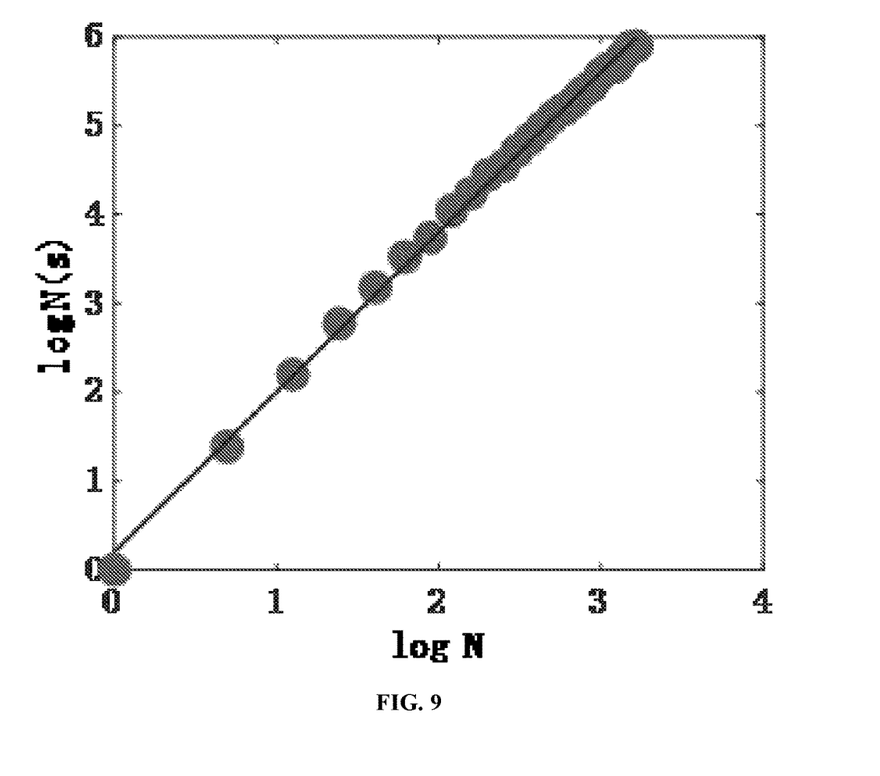
FIG. 9 illustrates calculation of a fractal box dimension of an analysis image.

S8: Normalize an interval for an area ratio of a half-cast mark in each of the first contrast image and the second contrast image, and establish a quantitative relation ω=(D)$^\beta$ between a damage degree and a fractal dimension D, thereby determining a quantitative relation among the area ratio of the half-cast mark region, the damage variable and the fractal dimension.

S9: Determine a damage value of the third analysis image through linear interpolation calculation on an area ratio of a half-cast mark.

Figure 10:
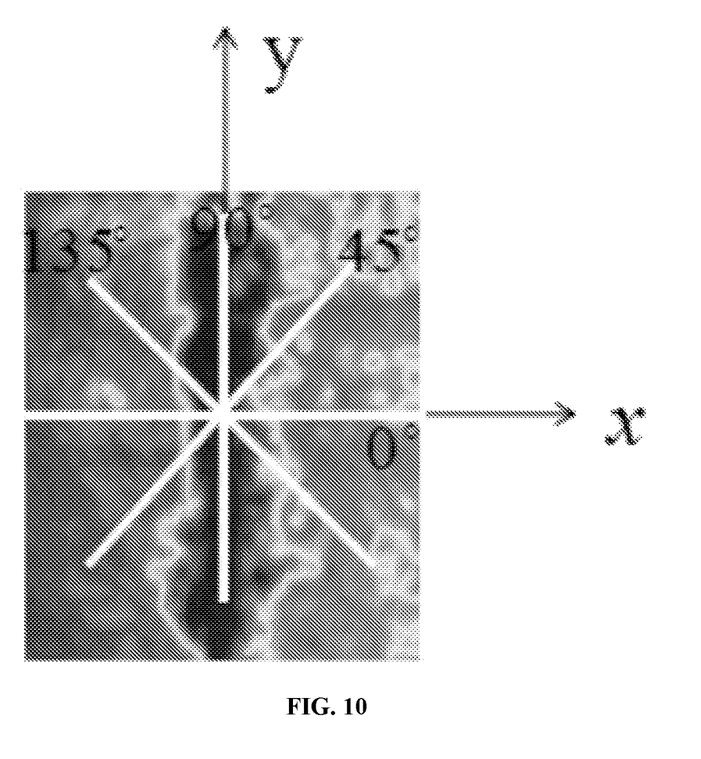
FIG. 10 illustrates division of a feature extraction direction in a GLCM.

S10: Extract, for each of a plurality of half-cast mark identified images with a GLCM in 0°, 45°, 90°, and 135° directions or 180°, 225°, 270°, and 315° directions, five eigenvalues including an energy mean, an entropy mean, a contrast mean, a correlation mean, and a uniformity mean, thereby forming a 5D eigenvector.

Figure 11:
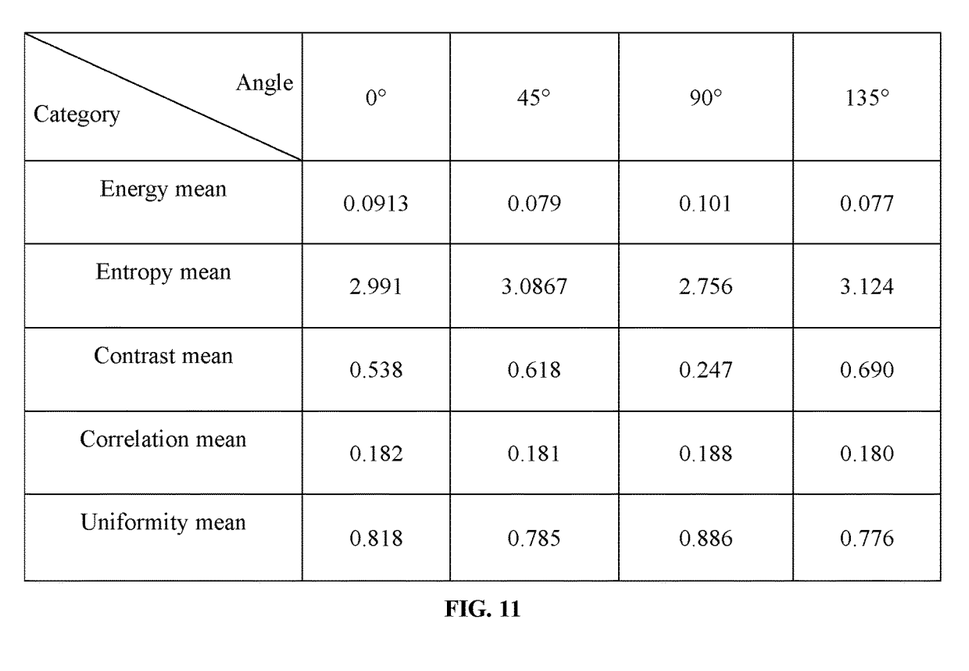
FIG. 11 illustrates an eigenvector value of an analysis image.

S11: Respectively photograph 90 blasting images for a tunnel excavation surrounding rock surface in three blasting plans, which specifically include conventional blasting, presplit blasting and smooth blasting and employ a same explosive charge during tunneling, to form a set C={$c_1$, $c_2$, $c_3$}, analyze target matrices corresponding to the conventional blasting, the presplit blasting and the smooth blasting, and obtain 5D eigenvectors F={$f_1$, $f_2$, $f_3$, $f_4$, $f_5$} in different blasting plans, where a feature attribute of each of the images is composed of a 5D eigenvector, including an energy mean, an entropy mean, a contrast mean, a correlation mean, and a uniformity mean, thereby obtaining a multi-dimensional digital information feature of the image.

Figure 12:
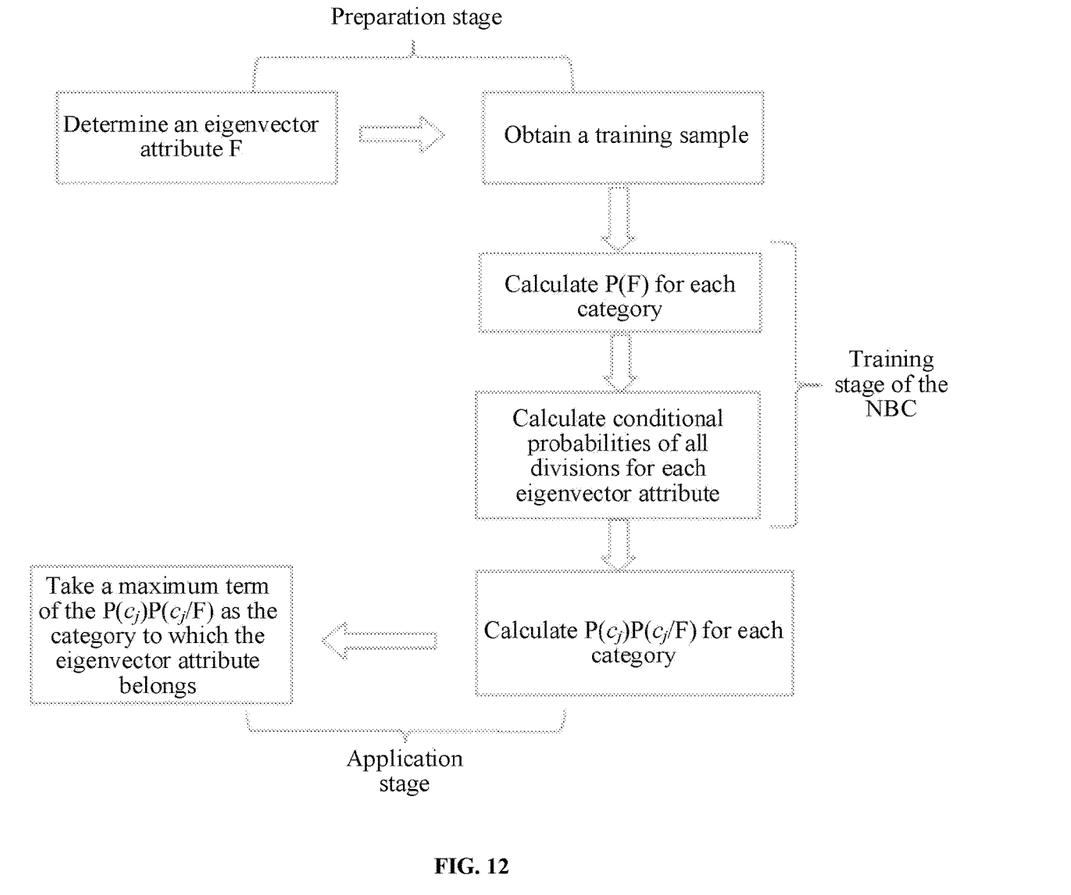
FIG. 12 is a flowchart of an NBC.

S12: Randomly select 5D eigenvectors of 60 images from the image set in the three different blasting plans as training data to input to an NBC, and calculate, with five eigenvalues $f_i$(i=1,2,3,4,5) of each of the images, a probability that a training image falls into a category $c_j$(j=1,2,3)

$$P(c_j/F) = \frac{P(c_j)P(c_j/F)}{P(F)} = \frac{P(c_j)P(f_1, f_2, f_3, f_4, f_5/c_j)}{P(F)},$$

where for an eigenvector F, a larger posterior probability $P(c_j/F)$ indicates a higher probability that the F falls into $c_j$, and the category into which the F falls is calculated by:

$$c(F) = \operatorname{argmax} P(c_j) \prod_{j=1}^{3} P(f_i | c_j),$$

and after $P(c_j)$ and $P(c_j/F)$ are calculated, a category with a maximum posterior probability is returned, thereby obtaining the category of the F. A training number is set as 1,000 times; and the NBC is trained repeatedly with a plurality of sets of image data, until a classification error in training is less than $10^{-3}$.

Figure 13:
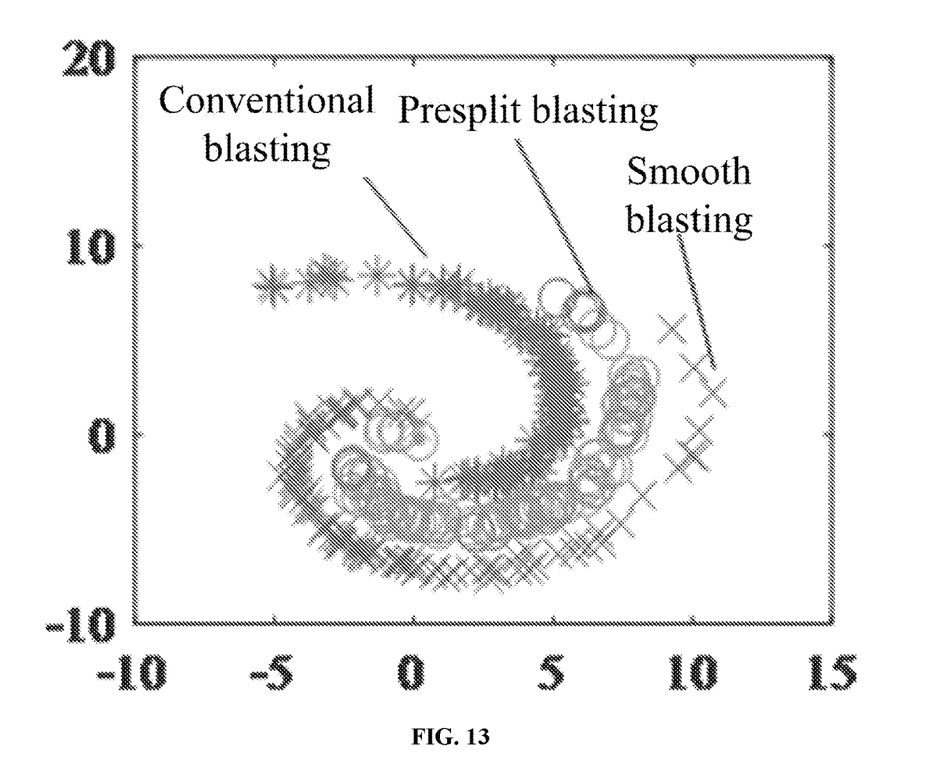
FIG. 13 illustrates an evaluation and classification result of an NBC.
Figure 14:
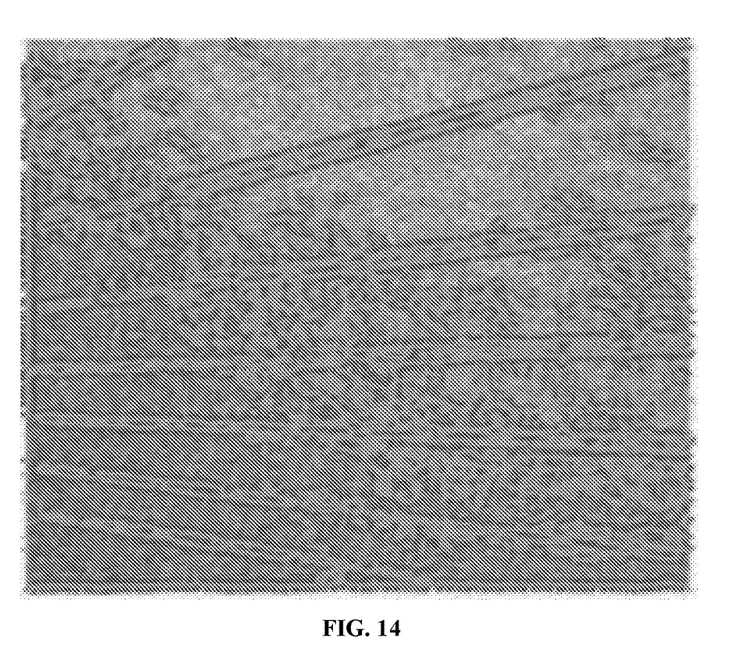
FIG. 14 illustrates a half-cast mark and flatness identified result for a group of blastholes.

S13: Input eigenvectors of remaining 30 images in the image set in the different blasting plans to a well-trained NBC, and determine a state with a maximum probability in different given categories $c_j$(j=1,2,3) based on an MAP principle of the NBC to take as a final result for evaluation and classification of the blasting plans, thereby implementing classification on blasting effects of the conventional blasting, the presplit blasting and the smooth blasting and on damaged flatness of surrounding rock surfaces.

The ImageJ software has a version of 1.8.0. The GLCM is implemented by extracting the eigenvalues in 0°, 45°, 90°, and 135° directions.

According to FIG. 12, the workflow of the NBC can be divided into a preparation stage, a training stage of the NBC, and an application stage. The preparation stage is to determine an eigenvector attribute F and obtain a training sample. The training stage is to determine P(F) for each category, and calculate conditional probabilities of all divisions for each eigenvector attribute. The application stage is to calculate $P(c_j)P(c_j/F)$ for each category, and take a maximum term of the $P(c_j)P(c_j/F)$ as the category to which the eigenvector attribute belongs.

The foregoing are merely descriptions of preferred specific embodiments of the present disclosure, but the protection scope of the present disclosure is not limited thereto. Any equivalent replacement or modification made within a technical scope of the present disclosure by a person skilled in the art according to the technical solutions of the present disclosure and inventive concepts thereof shall fall within the protection scope of the disclosure.

What is claimed is:

1. A half-cast mark identification and damaged flatness evaluation and classification method for blastholes in tunnel blasting, comprising the following specific steps:
    S1: photographing standard contrast images, a size of each of the standard contrast images being comprehensively determined by an analysis scale, and the standard contrast images comprising a first contrast image of a surrounding rock surface with an ideal half-cast mark and a second contrast image that is unacceptable with excessive backbreak or overbreak;
    S2: acquiring a half-cast mark image after actual blasting to serve as a third analysis image, a size and a photographing environment of the analysis image being consistent with those of the above contrast images;
    S3: denoising the above three images by a two-dimensional (2D) Gaussian algorithm according to a characteristic that Gaussian noise in an acquired image obeys a normal distribution;
    S4: performing gray-scale processing on three denoised images according to a preset threshold of an image histogram to reduce an original data volume in each of the images;
    S5: performing binary processing on gray-scale processed images, and setting an optimal binary threshold by maximum entropy thresholding;
    S6: identifying a boundary and a related region of a half-hole mark in each of the images with a gradient vector flow (GVF)-Snake and active contour model (ACM) (GVF-Snake-ACM);
    S7: importing each of three half-cast mark identified images to ImageJ software, and determining a ratio of an area of a half-cast mark region to a total area of the image as a flatness damage variable;
    S8: normalizing an interval for an area ratio of a half-cast mark in each of the first contrast image and the second contrast image, and establishing a quantitative relation $\omega=(D)^\beta$ between a damage degree and a fractal dimension D, thereby determining a quantitative relation among the area ratio of the half-cast mark region, the damage variable and the fractal dimension;
    S9: determining a damage value of the third analysis image through linear interpolation calculation on an area ratio of a half-cast mark;
    S10: extracting, for each of a plurality of half-hole mark identified images with a gray-level co-occurrence matrix (GLCM) in 0°, 45°, 90°, and 135° directions or 180°, 225°, 270°, and 315° directions, five eigenvalues comprising an energy mean, an entropy mean, a contrast mean, a correlation mean, and a uniformity mean, thereby forming a five-dimensional (5D) eigenvector;

S11: respectively photographing 90 blasting images for a tunnel excavation surface in three blasting plans, which specifically comprise conventional blasting, presplit blasting and smooth blasting and employ a same explosive charge during tunneling, to form a set C={$c_1$, $c_2$, $c_3$}, analyzing target matrices corresponding to the conventional blasting, the presplit blasting and the smooth blasting, and obtaining 5D eigenvectors F={$f_1$, $f_2$, $f_3$, $f_4$, $f_5$} in different blasting plans, wherein a feature attribute of each of the images is composed of a 5D eigenvector, comprising an energy mean, an entropy mean, a contrast mean, a correlation mean, and a uniformity mean, thereby obtaining a multi-dimensional digital information feature of the image;

S12: randomly selecting 5D eigenvectors of 60 images from the image set in the three different blasting plans as training data to input to a naive Bayes classifier (NBC), and calculating, with five eigenvalues $f_i$(i=1,2,3,4,5) of each of the images, a probability that a training image falls into a category $c_j$(j=1,2,3):

$$P(c_j/F) = \frac{P(c_j)P(c_j/F)}{P(F)} = \frac{P(c_j)P(f_1, f_2, f_3, f_4, f_5/c_j)}{P(F)},$$

wherein for an eigenvector F, a larger posterior probability $P(c_j/F)$ indicates a higher probability that the F falls into $c_j$, and the category into which the F falls is calculated by:

$$c(F) = \mathrm{argmax} P(c_j) \prod_{j=1}^{3} P(f_i \mid c_j),$$

and after $P(c_j)$ and $P(c_j/F)$ are calculated, a category with a maximum posterior probability is returned, thereby obtaining the category of the F; and S13: inputting eigenvectors of remaining 30 images in the image set in the different blasting plans to a well-trained NBC, and determining a state with a maximum probability in different given categories $c_j$(j=1,2,3) based on a maximum a posteriori (MAP) principle of the NBC to take as a final result for evaluation and classification of the blasting plans, thereby implementing classification on blasting effects of the conventional blasting, the presplit blasting and the smooth blasting and on damaged flatness of surrounding rock surfaces.

2. The half-cast mark identification and damaged flatness evaluation classification method for blastholes in tunnel blasting according to claim 1, wherein in step S3, a Gaussian filter based model satisfies the following 2D Gaussian distribution:

$$G(x, y) = \frac{1}{2\pi\sigma^2} e^{-\frac{x^2+y^2}{2\sigma^2}},$$

wherein x and y are transverse and longitudinal sizes of the image, and $\sigma^2$ is a variance of the normal distribution.

3. The half-cast mark identification and damaged flatness evaluation classification method for blastholes in tunnel blasting according to claim 1, wherein in step S5, the maximum entropy thresholding specifically comprises:

defining, according to a concept of a Shannon entropy, an entropy of an image having a gray scale in a range of 0, 1, 2, . . . , L−1 as $$H = \sum_{i=0}^{L-1} iP_i,$$

$P_i$ being a probability that a pixel having a value of i occupies the whole image, and dividing the image into a target O and a background B according to a set threshold t, probabilities of the pixel in the target and the background being:

$$\text{region } O: \frac{P_i}{P_t}, i = 0, 1, \ldots, t, \text{ wherein, } P_t = \sum_{i=0}^{t} P_i; \text{ and}$$

$$\text{region } B: \frac{P_i}{1-P_t}, i = t+1, \ldots, L-1.$$

4. The half-hole mark identification and damaged flatness evaluation classification method for blastholes in tunnel blasting according to claim 3, wherein the target O and the background B each have the following entropy function:

$$H_o(t) = -\sum_{i=0}^{t} \frac{p_i}{P_t} \ln \frac{p_i}{P_t} = \ln P_t + \frac{H_t}{P_t},$$

wherein $H_t = -\sum_{i=0}^{t} p_i \ln p_i;$ $$H_B(t) = -\sum_{i=t+1}^{L-1} \frac{p_i}{1-P_t} \ln \frac{p_i}{1-P_t} = \ln(1-P_t) + \frac{H-H_t}{1-P_t},$$

wherein $H = -\sum_{i=0}^{L-1} p_i \ln p_i;$ a total entropy of the image is:

$$H(t) = H_o(t) + H_B(t) = \ln P_t(1-P_t) + \frac{H_t}{P_t} + \frac{H-H_t}{1-P_t}$$

the total entropy of the image is maximized through a maximum threshold T:

T=arg max(H(t)); and the optimal binary threshold is determined according to a principle of maximizing the total entropy of the image.

5. The half-cast mark identification and damaged flatness evaluation and classification method for blastholes in tunnel blasting according to claim 1, wherein step S6 specifically comprises:

S61: acquiring pixel points on a row and a column of an initial image $I_{m \times n}$ (having a resolution of m×n) at a step length d=2, and performing downsampling for s times to obtain s+1 to-be-tested images (comprising the initial image $I_{m \times n}$), wherein a resolution in kth sampling is $$I_{\frac{m}{2^k} \times \frac{n}{2^k}}.$$

S62: preprocessing an image $$I_{\frac{m}{2^s} \times \frac{n}{2^s}}$$

in sth downsampling, performing edge detection with a Canny operator, defining an initial contour $l_{s+1}$ on an edge image, a number of control points on the initial contour $l_{s+1}$ being $N_{s+1}$, and calculating a GVF external force field, wherein due to a diffusivity of the GVF external force field in a smooth region, the initial contour $l_{s+1}$ approaches continuously to an edge of the image; and when $0.98N_{s+1}$ control points on the initial contour $l_{s+1}$ reach a target contour (a termination criterion), it is considered that an initial contour curve reaches a target edge, and iteration is stopped to obtain a target contour curve $l_s$ at the resolution $$\frac{m}{2^s} \times \frac{n}{2^s};$$

S63: preprocessing an image $$I_{\frac{m}{2^{s-1}} \times \frac{n}{2^{s-1}}}$$

in (s−1)th downsampling with the Canny operator, taking the contour curve $l_s$ in the previous step as an initial contour curve, recalculating a GVF external force field on the image $$I_{\frac{m}{2^{s-1}} \times \frac{n}{2^{s-1}}},$$

and obtaining a target contour curve $l_{s-1}$ according to the termination criterion in step S62 under pushing of an external force; and S64: repeating step S63, to until a target contour curve l of the identified image $I_{m \times n}$ is obtained.

6. The half-cast mark identification and damaged flatness evaluation and classification method for blastholes in tunnel blasting according to claim 1, wherein in step S7, the flatness damage variable is calculated by $$\omega = \frac{A^*}{A} = \frac{n^*}{n},$$

wherein $A^*$ is the area of an identified half-hole mark region, A is the total area of the image, $n^*$ is a number of pixel points in the half-hole mark region of the image, and n is a total number of pixel points in the image.

7. The half-cast mark identification and damaged flatness evaluation and classification method for blastholes in tunnel blasting according to claim 6, wherein in step S7, $\omega=0$ indicates that the half-cast mark is clear in a damage negligible state; $\omega=1$ indicates that the half-cast mark is diffused in a completely damaged state; and $0<\omega<1$ indicates that the surrounding rock surface is damaged in different degrees.

8. The half-cast mark identification and damaged flatness evaluation and classification method for blastholes in tunnel blasting according to claim 1, wherein in step S12, a training number is set as 1,000 times; and the NBC is trained repeatedly with a plurality of sets of image data, until a classification error in training is less than $10^{-3}$.

* * * * *